3,580,922
PHOSPHORYLATED HETEROCYCLIC COMPOUNDS

Glenn R. Price and Edward N. Walsh, Chicago Heights, Ill., assignors to Stauffer Chemical Company, New York, N.Y.
No Drawing. Filed Dec. 28, 1964, Ser. No. 421,609
Int. Cl. C07f 9/08, 9/16
U.S. Cl. 260—304           6 Claims

ABSTRACT OF THE DISCLOSURE

Heterocyclic compounds containing thiophosphatoalkyl groups, useful as herbicides, having formula

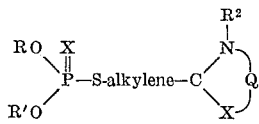

where R and R' are lower alkyl, X is oxygen or sulfur, $R^2$ is H or lower alkyl, Q is ethylene, propylene, or phenylene.

---

This invention relates to organophosphorus compounds. In particular, the invention pertains to phosphorylated heterocyclic compounds, their method of preparation, and use as herbicides.

The novel compounds of the invention may be represented by the general formula

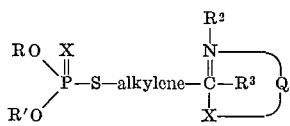

wherein "alkylene" represents a polymethylene bridge having from 1 to 3 carbon atoms; R and R' are lower alkyl; the radicals represented by X are independently selected from the group consisting of sulfur and oxygen; $R^2$ is selected from the group consisting of lower alkyl and hydrogen; $R^3$ is selected from the group consisting of alkyl of from 1 to 3 carbons and hydrogen; and Q is selected from the group consisting of ethylene, propylene, and phenylene. R, R' and $R^2$ include both straight and branched chain alkyl having from 1 to 8 carbon atoms, such as methyl, ethyl, propyl, isopropyl, amyl, octyl, and the like. $R^3$ is preferably lower alkyl, straight or branched, having from 1 to 3 carbon atoms such as methyl, ethyl, propyl, and isopropyl.

The general process for preparing the compounds of the invention may be illustrated by the following reaction

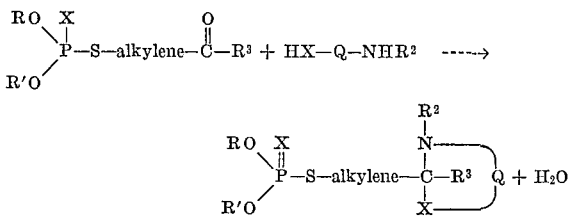

wherein R, R', $R^2$, $R^3$, X, Q and alkylene are the same as defined hereinbefore, although the process is not dependent on any particular media, the reaction is preferably carried out in the presence of a relatively inert, normally liquid organic solvent and in this connection it is recommended to use liquid hydrocarbons which form an azeotrope with water (hereinafter referred to as an azeotrope former) such as toluene, benzene, xylene, and the like, so that the water produced in the reaction may be removed through azeotropic distillation. The azeotrope former may also be added after the reaction is completed or well along towards completion so that little is lost through evaporation, or the water formed may be removed by distillation without the use of any azeotrope former. When added initially to the reaction mixture, the azeotrope former acts as a solvent.

The temperature of the reaction is not critical, but should not be so high as to cause decomposition of the product or so low as to require an excessively long reaction time. A workable temperature range extends from about 30° C. to about 100° C. with a preferred range in the vicinity of 25° C. to 60° C.

In the preferred process, stoichiometric quantities of the amino compound and the phosphorylated aldehyde or ketone are mixed with an azeotrope former, reacted and distilled under partial vacuum. The azeotrope is condensed and the heavier water layer is separated. The azeotrope former is then removed upon concentration of the product.

The following non-limiting examples illustrate the preparation of the novel compounds of the invention.

EXAMPLE 1

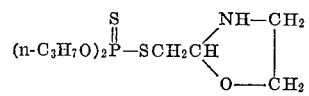

To a three necked reactor flask fitted with a thermometer, stirring rod and Barrett trap fitted with a condenser, were added 150 ml. benzene, 30.7 grams (0.12 mole) of O,O-(di-n-propyl) - S - (formyl methylene) dithiophosphate and 7.3 grams (0.12 mole) of amino ethanol. The mixture was then refluxed under vacuum while maintaining the temperature of the mixture at 50° C. until a theoretical amount (0.12 mole) of water was removed. The product was then concentrated to 58° C. at 1.5 mm. Hg to give 29.9 grams (83.5% yield) of 2-[O,O-di-n-propyl phosphorothiomethylene] oxazolidine having an analysis of 9.6% P and 20.3% S as compared to theoretical percentages of 10.3% P and 21.2% S.

EXAMPLE 2

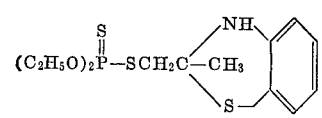

To a three necked reaction flask containing a thermometer, stirring rod, and Barrett trap fitted with a condenser, were added 150 ml. benzene, 31.5 grams (0.13 mole) of O,O-(diethyl)-(S-actylmethylene) dithiophosphate and 16.3 grams (0.13 mole) o-amino benzenethiol. The mixture was then refluxed under partial vacuum while maintaining the temperature of the mixture at 60° C. until a theoretical amount (0.13 mole) of water was removed. The product was then concentrated to 60° C. at 1.5 mm. Hg to give 42.5 grams (94.5% yield) of 2--[O,O-diethyl phosphorodithiomethylene] 2-(methyl)-1,3 benzothiazoline, having an analysis of 8.3% P and 27.2% S as compared to theoretical percentages of 8.8% P and 27.4% S.

The following specific compounds may be prepared in accordance with the procedure shown in Examples 1 and 2, in the yields indicated. Sample analyses are included in some of the examples.

EXAMPLE 3

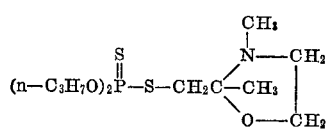

2-[O,O-di n-propyl phosphorodithiomethylene] 2,3-(dimethyl) 1,3-oxazolidine; yield=99% of theory; analysis: 9.3% P and 19.9% S as compared to 9.45% P and 19.6% S, theoretical.

EXAMPLE 4

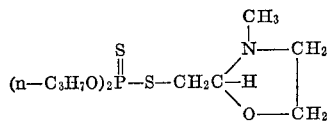

2-[O,O-di n-propyl phosphorodithiomethylene] N-methyl 1,3-oxazolidine; yield=95.5% of theory; analysis: 9.8% P and 20.8% S as compared to 9.9% P and 20.5% S, theoretical.

EXAMPLE 5

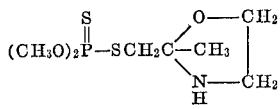

2-[O,O-dimethyl phosphorodithiomethylene] 2-(methyl) 1,3-oxazolidine; yield=92% of theory; analysis: 13% P and 24.1% S as compared to 12.1% P and 24.8% S, theoretical.

EXAMPLE 6

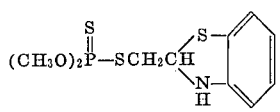

2-[O,O-dimethyl phosphorodithiomethylene] 1,3-benzothiazoline; yield 94.5% of theory; analysis: 9.7% P and 29.9% S compared to 9.7% P and 31.1% S, theoretical.

EXAMPLE 7

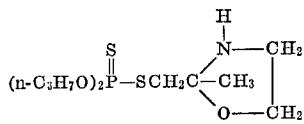

2-[O,O-di n-propyl phosphorodithiomethylene]-2-(methyl) 1,3-oxazolidine; yield 98% of theory; analysis: 9.8% P and 20.2% S compared to 9.9% P and 20.4% S, theoretical.

EXAMPLE 8

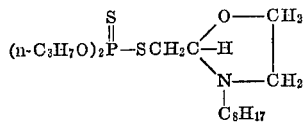

2-[O,O-di n-propyl phosphorodithiomethylene] N-octyl 1,3-oxazolidine; yield 98% of theory; analysis: 8.6% P and 18.5% S compared to 7.9% P and 16.1% S, theoretical.

EXAMPLE 9

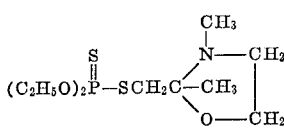

2-[O,O-diethyl phosphorodithiomethylene]-2-(methyl) N-methyl 1,3-oxazolidine; yield=98.2% of theory; analysis: 10.1% P and 20.9% S compared to 10.3% P and 21.4% S, theoretical.

EXAMPLE 10

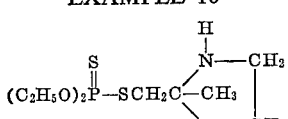

2-[O,O-diethyl phosphorodithiomethylene]-2-(methyl) 1,3-thiazolidine; yield=91.5% of theory; analysis: 9.9% P and 30.8% S compared to 10.3% P and 31.8% S, theoretical.

EXAMPLE 11

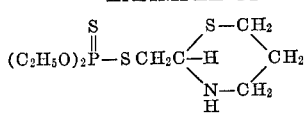

2-[O,O-diethyl phosphorodithiomethylene tetrahydrothiazine.

EXAMPLE 12

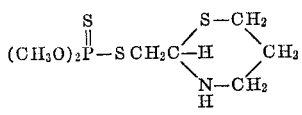

2-[O,O-dimethyl phosphorodithiomethylene] tetrahydrooxazine.

The compounds of the present invention were tested for herbicidal activity on a variety of economically important plant species. Unusually high herbicidal activity was observed against pinto bean when typical compounds of the invention were applied as a post-emergent spray. The following table illustrates the general herbicidal activity of the phosphorylated oxazolidines and thiazolidines when used as pre-emergence and post-emergence sprays on a group of common weed pests. The data on extent of injury obtained from plant physiological tests are reported hereinafter as "+" for slight injury (25% to 35% control), ++ for moderate injury (55% to 65% control), and +++ for severe injury (85% to 100% control). To more specifically define the type of injury observed, the superscripts "LB" (leaf burn), "MF" (leaf malformation), "IG" (inhibited germination), "ST" (stunting) and "TK" (tip kill) are shown when applicable. The following reference characters represent the indicated plant species tested: C=crabgrass, P=pigweed, L=pinto bean, and W=watergrass.

TABLE.—HERBICIDAL ACTIVITY OF PHOSPHORYLATED OXAZOLES AND THIAZOLES ON SELECTED WEED SPECIES

| Compound, (Example No.) | Mode of application | C | P | L | W |
|---|---|---|---|---|---|
| 1 | Pre-emergence | + +$^{ST}$ | | | |
|   | Post-emergence | | | + | +$^{TK}$ |
| 2 | Pre-emergence | | + + +$^{IG}$ | | |
| 3 | Post-emergence | + +$^{MF}$ | | + + +$^{TK}$ | +$^{LB}$ |
| 4 | do | | | + + +$^{TK}$ | +$^{LB}$ |
| 5 | Pre-emergence | | + +$^{IG}$ | | |
|   | Post-emergence | + + +$^{ST}$ | | | |
| 6 | do | + +$^{ST}$ | | | + +$^{ST}$ |
| 7 | do | | | + + +$^{TK}$ | |
| 8 | do | | | + + +$^{TK}$ | $^{ST}$ |
| 9 | do | | | + + + +$^{TK}$ | |
| 10 | do | | | + +$^{TK}$ | |

Pre-emergence herbicidal tests were conducted following planting, but prior to emergence of the plants, usually the day following planting. The active compounds were applied to a concentration of 20 lbs. of active material diluted in water to a volume of 143 gallons for each planted acre treated. The aqueous herbicidal solution or dispersion was simply sprayed on the pre-planted soil from a hand sprayer. After fourteen days, plants were inspected and compared with an untreated control group planted on the same day.

Post-emergence herbicidal tests were initiated approximately two weeks following the emergence of new plants. The method of application involved spraying on the plant foliage a 0.5% aqueous solutions or dispersion of active compound to the point of run-off. A concentration of active material when spraying the solution was approximately 20 lbs. per acre diluted to a spray volume of 475 gallons per acre. Evaluation of herbicidal activity was made after fourteen days.

Although the above tests were accomplished with aqueous dispersions or solutions, the toxic compounds may also be used in the form of wettable powders, vapors and dusts, as may be best suited to the conditions of use. For more specialized application, the toxicant material may even be used in its pure, undiluted form.

The foregoing description is given for clearness of understanding only and no unnecessary limitations should be understood therefrom as modifications will be obvious to those skilled in the art.

We claim:
1. A compound having the formula

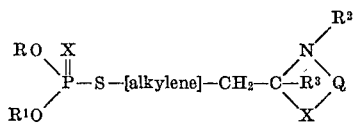

wherein R and $R^1$ are lower alkyl; the groups represented by X are independently selected from the group consisting of sulfur and oxygen; $R^2$ is selected from the group consisting of lower alkyl and hydrogen; $R^3$ is selected from the group consisting of alkyl of from 1 to 3 carbons and hydrogen and Q is selected from the group consisting of ethylene, trimethylene, and phenylene.

2. 2-[O,O-di n-propyl phosphorodithiomethylene] 1,3-oxazolidine.
3. 2-[O,O-di n-propyl phosphorodithiomethylene] 2,3-(di-methyl) 1,3-oxazolidine.
4. 2-[O,O - dimethyl phosphorodithiomethylene]-2-(methyl)-1,3-oxazolidine.
5. 2-[O,O-di n-propyl phosphorodithiomethylene] N-methyl, 1,3-oxazolidine.
6. 2-[O,O-diethyl phosphorodithiomethylene]-2 (methyl) 1,3-benzothiazoline.

References Cited
UNITED STATES PATENTS 2,490,392  12/1949  Whetstone et al. ____ 260—307

FOREIGN PATENTS 932,388  7/1963  Great Britain _____ 260—302

OTHER REFERENCES

Eldesfield, Heterocyclic Compounds, vol. 5, (New York, 1957), pp. 391, 508–509 and 697–699.

ALTON D. ROLLINS, Primary Examiner

U.S. Cl. X.R.

71—87; 260—243R, 244R, 306.7, 307D, 307F

PO-1050
(5/69)

UNITED STATES PATENT OFFICE
CERTIFICATE OF CORRECTION

Patent No. 3,580,922    Dated May 25, 1971

Inventor(s) Glenn R. Price and Edward N. Walsh

It is certified that error appears in the above-identified patent and that said Letters Patent are hereby corrected as shown below:

Column 1, between lines 30 and 35, the portion of the structural formula reading " 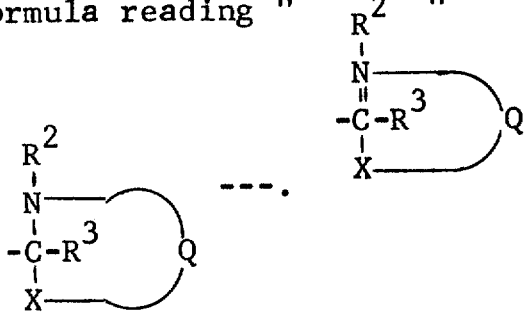 "

should read --- 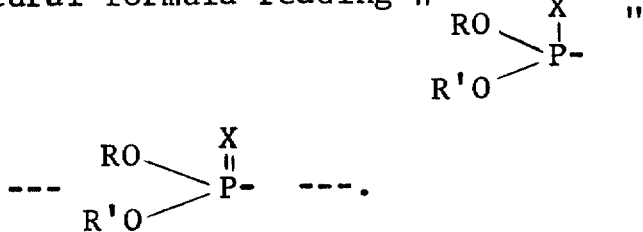 ---.

Column 1, between lines 52 and 55, the portion of the structural formula reading "
$$\begin{array}{c} RO \\ R'O \end{array} \!\!\!> \!\!\! \overset{\overset{X}{\|}}{P}-$$
"

should read ---
$$\begin{array}{c} RO \\ R'O \end{array} \!\!\!> \!\!\! \overset{\overset{X}{\|}}{P}-$$
---.

Column 2, line 51, the portion of the line reading " -(S-actylmethylene) ", should read --- -S-(acetylmethylene) ---.

Signed and sealed this 11th day of January 1972.

(SEAL)
Attest:

EDWARD M. FLETCHER, JR.
Attesting Officer

ROBERT GOTTSCHALK
Acting Commissioner of Patents